United States Patent [19]

Liard

[11] 4,325,202
[45] Apr. 20, 1982

[54] KNOCK-DOWN PLANT POT

[76] Inventor: Maurice Liard, 276, de Salaberry St., Joliette, Quebec, Canada, J6E 4G2

[21] Appl. No.: 159,063

[22] Filed: Jun. 13, 1980

[51] Int. Cl.³ .......................... A01G 9/02; A01G 9/04
[52] U.S. Cl. ............................................. 47/73; 47/71; 47/67
[58] Field of Search ........................ 47/73, 71, 77, 67

[56] References Cited

U.S. PATENT DOCUMENTS

| D. 226,279 | 2/1973 | Eyerly | 47/73 X |
|---|---|---|---|
| 153,715 | 8/1874 | Landers | 47/71 |
| 402,722 | 5/1889 | Cook | 47/73 |
| 548,763 | 10/1895 | Simpson | 47/73 |
| 592,066 | 10/1897 | Simpson | 47/73 |
| 1,774,019 | 8/1930 | Lam | 47/73 |
| 2,594,307 | 4/1952 | Valenzuela | 47/73 |
| 3,006,496 | 10/1961 | Weiman | 47/73 X |
| 3,991,516 | 11/1976 | Cicero | 47/73 X |

*Primary Examiner*—Steven A. Bratlie

*Attorney, Agent, or Firm*—Robic, Robic & Associates

[57] ABSTRACT

Knock-down plant pot separable into component parts to free the plant that it contains without affecting the radicular system of the plant. It is made up of a plant-retaining wall portion formed by arcuate segments that abut one another, a holder being provided to releasably lock the segments in firm abutting relationship, this holder including locking strips that are provided outwardly of the wall segments, each strip having a groove at its lower end. The pot further includes a saucer portion for holding the wall portion. This saucer portion has an upstanding peripheral skirt and a series of horizontal thread portions projecting inwardly from the skirt and capable of being snugly received into the grooves at the bottom of the strips so that the wall portion may be held firm in the saucer portion. These thread portions are spaced from one another a distance sufficient to allow the strips to be inserted therebetween prior to be rotated for engagement of the thread portions into the grooves.

4 Claims, 6 Drawing Figures

KNOCK-DOWN PLANT POT

The present invention relates to a knock-down plant pot, that is to a container of the general type wherein the plant-retaining lateral wall can be collapsed into separable component parts to free the plant without causing damage to the radicular system of the plant.

There has, in the prior art, been several suggestions made as to the construction of this type of container and a search has revealed some examples in U.S. Pat. No. 1,774,019, of Aug. 26, 1930; 2,594,307, of Apr. 29th 1952 and 3,006,496 of Oct. 31st 1961.

All of the above suggestions relate to a plant pot wherein the lateral wall thereof is made of a plurality of separable wall parts, generally arcuate segments, held in edge abutting relationship by means of rings circumscribing the wall parts or segments. The lateral walls are upwardly tapered and the rings, in two of these cases, are resilient and forced into position either into receiving grooves or above a series of knobs or protuberances projecting from the wall segments whereby the latter are held in firm sidewall-defining configuration under the resiliency of the rings. The inconvenience with this type of construction is that, due precisely to the resiliency of the rings, the pot sidewall sections may inadvertently separate if knocked against an obstacle or through the sheer weight of the lump of soil if the pot is inclined when handled. The other type of container, which is upwardly tapered but square in horizontal cross-section, uses square or rectangular metal bands of which the ends are held together by clamps, the intention being to hold the sidewall parts firmly together by releasable friction tight engagement of the ends of the bands, there being no groove or protuberances to hold the bands in place along the container sidewall. The same difficulty appears here as in the earlier discussed cases in that the bands may easily slip down if inadvertently knocked against an obstacle or even through the weight of the soil in the pot which would of course cause untimely collapse of the container.

Consequently, an object of the present invention is to provide a plant pot of the above general type which, under the usual condition of use, will not be prone to so easily separate as in the prior art containers by providing a more positive releasable means holding the lateral wall segments together.

Another object of the invention lies in the provision of a saucer of special construction for use with the lateral wall of the plant pot, such a construction being absent in the prior art patents discussed above.

A further object of the invention lies in that this special saucer construction, apart from making the pot itself available for use as a general indoor container, structurally cooperates with the holding means of the sidewall segments to ensure firmer retention of the segments together.

Accordingly, what is being claimed herein is a knock-down plant pot separable in two component parts whereby to free a plant when contained therein without affecting the radicular system of the plant, the pot essentially comprising: an upright lateral plant-retaining wall portion made up of a plurality of arcuate segments abutting one another along upright edges thereof and means releasably holding the segments in firm abutting relationship, the holding means including locking strips projecting outwardly of the segments, each strip being formed with a groove at the lower end thereof. The lateral wall and holding means aforesaid cooperate with a saucer portion having an upstanding peripheral skirt provided with a series of horizontal thread portions projecting inwardly from the skirt and capable of being snugly received into the grooves at the bottom of the strips whereby the wall portion may be held firm in the saucer portion. Further, the thread portions are spaced apart a distance sufficient to allow the strips to be inserted therebetween prior to be rotated for engagement of the thread portions into the grooves.

Preferably, the depth of the thread portions increases gradually in one direction around the saucer portion whereby to provide increasing locking action as the wall portion is rotated in one direction. Also, the holding means may further comprise flanges along the abutting edges projecting outwardly of the wall segments, the strips being longitudinally grooved and the flanges and strip grooves having a mating dovetail configuration for interlocking engagement of the strips and flanges to hold the segments in the required abutting relationship while allowing upward sliding motion of the strip to free the segments from this interlocking engagement.

A preferred embodiment of the invention is now described hereinafter with reference to the appended drawings wherein.

Figure 1:
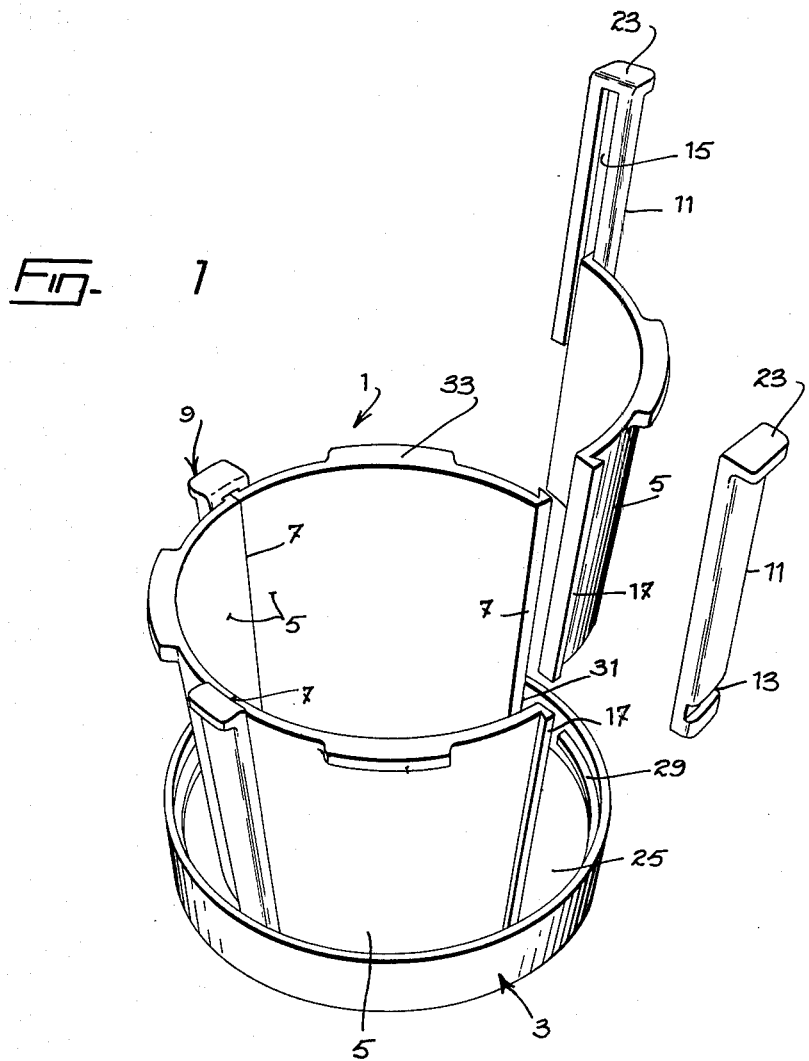
FIG. 1 is a perspective view of a plant pot made according to the invention in which one of the wall segments has been slid up and removed.

As shown particularly in FIGS. 1 through 4, the pot of the invention is made up of a plant-retaining lateral wall 1 capable of being securely retained in a saucer 3.

The lateral wall 1 is made up of a plurality of identically shaped and sized arcuate segments 5 abutting one another along upright edges 7, the segments being held in firm abutting relationship by strip means 9.

Figure 4:
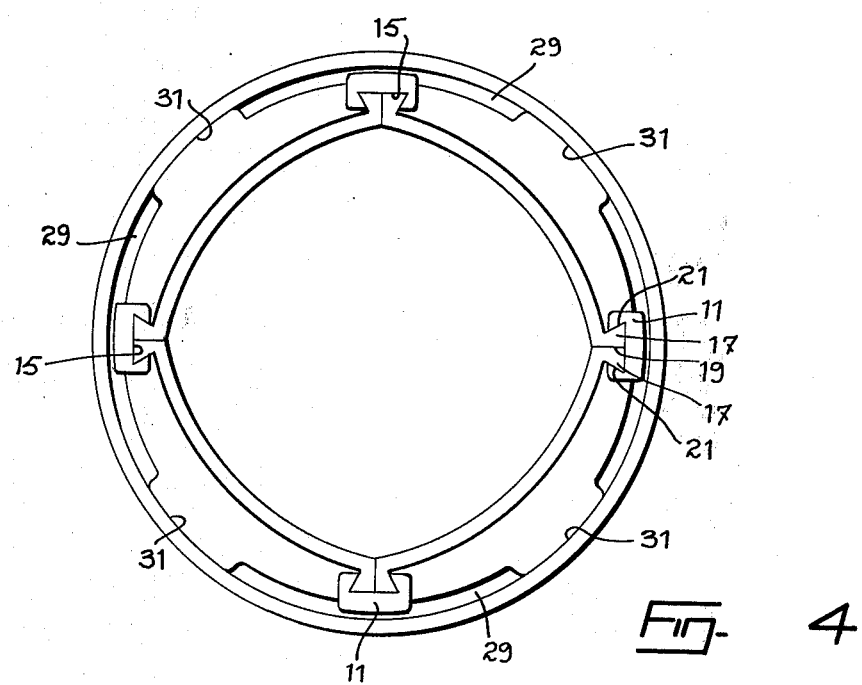
FIG. 4 is a horizontal cross-sectional view taken at mid-height, looking down, of the fully assembled pot of FIG. 1.

Each strip means is made up of an elongated strip 11 formed at the lower end with a transverse straight groove 13. On its inward face, the strip 11 has a dovetail slot 15 extending the full length thereof and opening at least at its bottom end. Cooperating with each strip 11 is a pair of flanges 17 projecting outwardly from the lateral edges of adjacent wall segments 5. As best seen in FIG. 4, each flange 17 has an outer radial face 19 and an inclined inner face 21 such that when two such adjacent flanges 17 abut one another along their common face 19, they define a dovetail configuration mating the dovetail groove 15 of the cooperating strip 11.

As shown in FIG. 1, the plant-retaining lateral wall is formed by abutting the wall segments together along their edges 7 and downwardly sliding the strips 11 along the dovetail configured flanges 17. Preferably, the top of each strip 11 is provided with a cap 23 closing up the slot 15 to prevent oversliding of the strip 11.

Thus, there can be provided an open-bottom plant-retaining lateral wall that can easily be assembled and that will not be subjected to easy collapse even if mishandled or knocked against unexpected obstacles.

While the plant-retaining lateral wall seems to be tapered, in fact, it is made of a portion of a cylinder to avoid the lateral displacement otherwise obtained with a conical shape.

Figure 2:
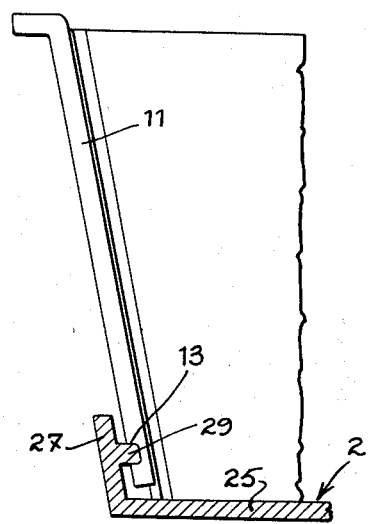
FIG. 2 is a vertical cross-section taken along a vertical plane through the leftward side of FIG. 1.

The saucer portion 3 especially featured to cooperate with the aforedescribed lateral wall is best illustrated in FIGS. 1 and 2. It is shown to be made up of a bottom 25 peripherally provided with an upstanding skirt 27. The latter has, inwardly thereof, thread portions 29 having a size suitable for insertion into the transverse grooves 13 of the strips 11. For a purpose to be determined later, each portion 29 preferably has a depth that gradually increases in one direction of the circular periphery of the saucer portion 3. Likewise, as best seen in FIG. 4, portions 29 are interrupted around the periphery of the skirt 27 as many times as there are holding means 9 or, more simply, strips 11. These interruptions define spaces 31 and it will be understood that such spaces 31 are provided to allow the insertion of the strips 11 (and corresponding lateral wall segments 5) right down to the bottom 25 of the saucer portion 3. Once the strips 11 and lateral wall segments are thus positioned, the transverse grooves 13 are in horizontal alignment with the thread portions 29 and rotation of the lateral wall, including the holding means, will engage the grooves 13 over the thread portions 29. If the depth of the thread portions 29 increases in one direction, as suggested above, the rotation will then be along that direction and, as will be gathered, this increasing depth of the thread portions 29 provides increasing locking action of the lateral wall and saucer portion as the wall portion is rotated.

Figure 3:
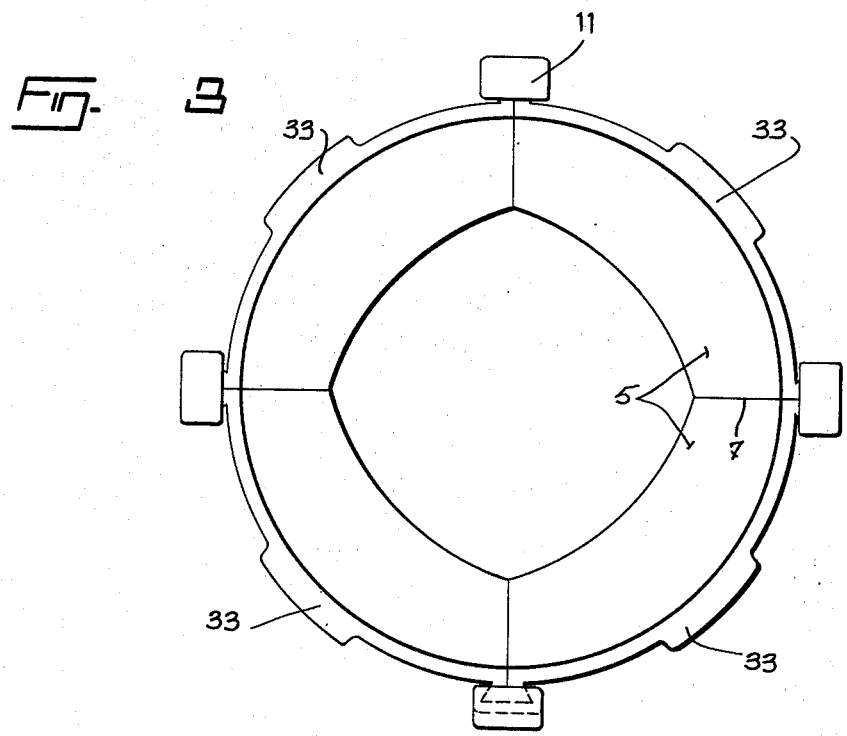
FIG. 3 is a top plan view of the lateral plant-holding wall portion of the pot of FIG. 1.

For easy handling of the lateral wall, during rotation or otherwise, projecting lugs 33 may be provided at the top of the segments 5 as seen in FIGS. 1 and 3.

It will thus be understood that the particular saucer portion just described will ensure constant and firm interlocking of the lateral wall and saucer of the plant pot of the invention under any condition of handling and use.

Figure 5:
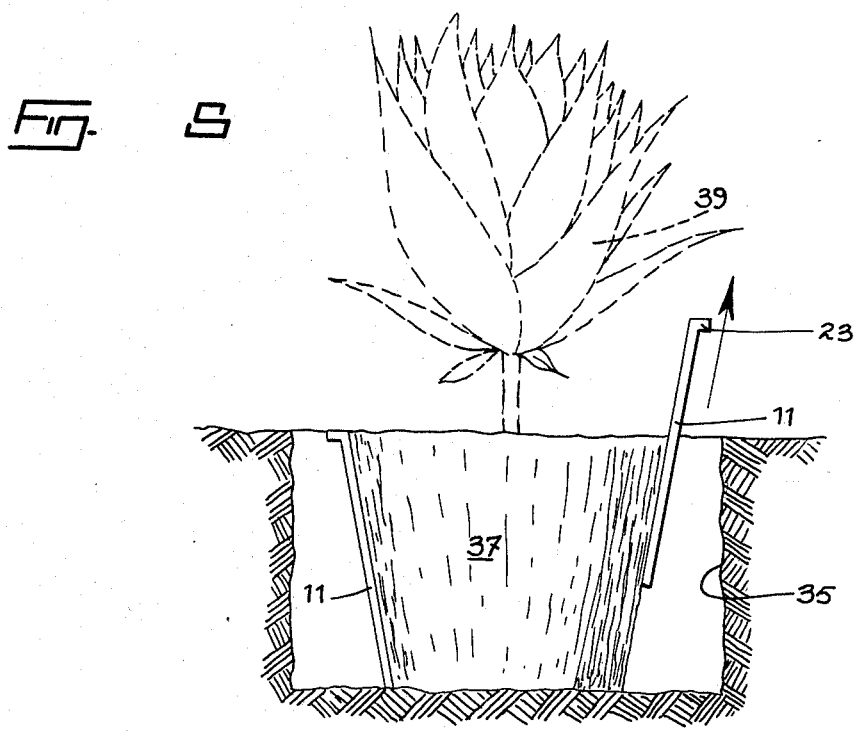
FIG. 5 is a vertical cross-section through the plant-retaining lateral wall to illustrate how the pot may be used when transplanting the plant into the earth.

Referring now more particularly to FIG. 5, whenever it is intended to transplant the plant into the soil, a hole 35 is first made into the ground, in the usual manner, and the saucer portion 3 is removed by counter rotation. What will then remain is the lump 37 of soil and roots still firmly retained in the lateral wall made up of the locked segments 5. By firmly holding the lump 37 around the foot of the plant 39, the locking strips 11 can easily be removed by sliding them upwardly through the tops 23 thereby releasing the wall segments which will then loosely fall into the hole 35 and thus can easily be removed. It will be appreciated that this operation can be made without disturbing in any way the radicular system of the plant.

A similar situation will of course exist if the plant is to be transplanted into a bigger pot.

Figure 6:
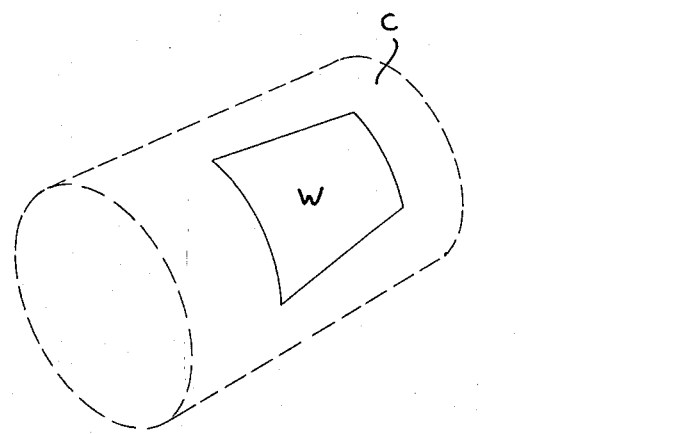
FIG. 6 is a perspective view of a tapering cylinder intended to illustrate how the lateral wall segments of the plant pot of the invention can be manufactured.

Reference is now made to FIG. 6 showing how the lateral wall segments 5, herein called W, are made in order to preclude any disturbance of the earth within the pot during transplantation into a new pot or plantation into earth, as in FIG. 5.

For this purpose, the wall segments W are cut out of a cylinder C, the two lateral edges of each segments being tapered so as to obtain the somewhat tapered appearance of the pot sidewall as seen in FIG. 1, particularly. However, it will be noted that the top and bottom edges of each segments are parallel arcs of circles. In this manner, referring to FIG. 5, when each segment is removed, the effect is that of a portion of a cylinder and not that of a frustum of a cone with consequently no disturbance of the earth, around the plant, by compression. In other words, when a wall segment W is removed, it is pulled in a direction parallel to the main axis of the cylinder C, when inclined, thereby preventing earth compression in the pot.

Naturally, the four walls of the illustrated pot would be cut of four similar cylinders, having axis canted symmetrically around the main axis of the pot.

It is obvious that various changes may be made in the present invention without departing from the spirit of the invention as defined in the appended claims.

I claim:

1. A knock-down plant pot separable into component parts whereby to free a plant when contained therein without affecting the radicular system of the plant, said pot comprising:

an upright lateral plant-retaining wall portion made up of a plurality of arcuate wall segments abutting one another along upright edges thereof and means releasably holding said segments in firm abutting relationship, said holding means including locking strips projecting outwardly of said segments, each strip being formed with a groove at the lower end thereof;

a saucer portion, for holding said wall portion, said saucer portion having an upstanding peripheral skirt and a series of horizontal thread portions projecting inwardly from said skirt and capable of being snugly received into said grooves at the bottom of said strips whereby said wall portion may be held firm in said saucer portion;

said thread portions being spaced from one another a distance sufficient to allow said strips to be inserted therebetween prior to be rotated, for engagement of said thread portions into said grooves; and each segment being cut-out of a cylinder with tapered side edges and parallel top and bottom arcuate edges, whereby each segment can be removed during a transplantation without disturbing the earth surrounding said segment.

2. A plant pot as claimed in claim 1, wherein the depth of said thread portions increases gradually in one direction around said saucer portion to provide increasing locking action as said wall portion is rotated in said one direction.

3. A plant pot according to claim 2, wherein said holding means further comprise flanges along edges of each pair of adjacent edges projecting outwardly of said wall segments, said strips being longitudinally slotted and wherein said flanges and strip slots have a mating dovetail configuration for interlocking engagement of said strips and jflanges to hold said segments in said abutting relationship and to allow upward sliding motion of said strips to free said segments from said interlocking engagement.

4. A plant pot as claimed in claims 1, 2 or 3, wherein said wall segments and holding means are identical in shape and size.

* * * * *